United States Patent [19]

Bernhardt

[11] Patent Number: 5,171,104
[45] Date of Patent: Dec. 15, 1992

[54] ARRANGEMENT FOR TREATING GAS FROM CONTAMINATED GROUND REGION

[75] Inventor: Bruno Bernhardt, Reutlingen, Fed. Rep. of Germany

[73] Assignee: IEG Industrie-Engineering GmbH, Betzingen, Fed. Rep. of Germany

[21] Appl. No.: 696,366

[22] Filed: May 6, 1991

[30] Foreign Application Priority Data

May 23, 1990 [DE] Fed. Rep. of Germany ....... 4016586
Jul. 9, 1990 [DE] Fed. Rep. of Germany ....... 4021814

[51] Int. Cl.⁵ .............................................. B09B 1/00
[52] U.S. Cl. ...................................... 405/128; 55/196
[58] Field of Search ............... 55/385.1, 196; 210/170; 405/128, 129

[56] References Cited
U.S. PATENT DOCUMENTS 4,943,305 7/1990 Bernhardt ............................ 55/196
4,950,394 8/1990 Bernhardt et al. ................. 210/170

Primary Examiner—Bernard Nozick
Attorney, Agent, or Firm—Michael J. Striker

[57] ABSTRACT

An arrangement for treating a gas from a contaminated ground region in situ has a shaft wall which is at least partially gas-permeable and forms a shaft in a gas-tightly closed ground region. The shaft wall has a gas-impermeable shaft portion spaced from a shaft opening and two gas-permeable wall portions which surround the gas-impermeable wall portion. Gas transporting means produces a gas circulating flow in the shaft and in the ground region. At least one device for influences the intensity of the gas flow in the shaft in dependence on the density of the ground region for producing and maintaining a laminar gas flow in the ground region. At least one element provided in the region of the gas-permeable wall operates for changing a composition of the gas flow.

24 Claims, 2 Drawing Sheets

5,171,104

ARRANGEMENT FOR TREATING GAS FROM CONTAMINATED GROUND REGION

BACKGROUND OF THE INVENTION

The present invention relates to an arrangement for treating of ground from a contaminated ground region in situ. More particularly, it relates to such an arrangement in which a shaft formed in this region of the gas-tightly covered ground, is provided with at least partially gas-permeable shaft wall.

For driving out of volatile impurities from the ground it is proposed to provide the shaft with a gas-permeable gas wall in the contaminated ground, in which by aspirating of air a negative pressure is produced and therefore the air together with the volatile impurities flows from the ground into the shaft and can be aspirated from the shaft to a filtering device. By means of additional openings arranged in a circle the post-flow of air into the contaminated ground can be improved, as disclosed for example in the German document DE-OS 3,728,299. The above mentioned objects are achieved with the method described hereinabove.

The cleaning of contaminated ground in which the impurities are mainly caused by substances which are difficult to dissolve, is more difficult and expensive. For these cases the contaminated ground is removed and the contaminants are removed by burning in the through flow ovens. It is also possible to deposit the removed ground in special garbage storages. These processes are connected with very high costs and can be used to a limited extent in vacant areas. Some tests however showed that it is possible even with a high fraction of non-volatile impurities to provide a cleaning of the ground in situ when a longer time is spent for treatment.

SUMMARY OF THE INVENTION

Accordingly, it is an object of the present invention to provide an arrangement of the above mentioned general type which avoids the disadvantages of the prior art.

More particularly, it is an object of the present invention to provide an arrangement of the above mentioned type with which a cleaning of contaminated ground can be provided with lower energy consumption and in a space-economical manner.

In keeping with these objects and with others which will become apparent hereinafter, one feature of the present invention resides, briefly stated, in that a portion with a gas-impermeable shaft wall is formed in a shaft at a distance from the tightly closed shaft opening, the gas-impermeable shaft wall is located between two shaft portions with gas-permeable walls, a gas transporting device for producing a gas circulating flow is provided in the shaft and in the ground, there is at least one device for influencing the intensity of the gas flow in the shaft in dependence on the density of the ground for producing and maintaining a laminar gas flow in the ground, and at least one element which influences the composition of the gas flow is arranged in the shaft portion with the gas-permeable wall.

In many cases it is sufficient to use air for forming the gas flow. In the shaft however a shaft treatment gas or carrier gas can be utilized. In this case it is important for the efficiency of the arrangement that the gas flow in the region of the gas outlet and the gas inlet in the shaft is adjusted so that the gas on its way through the contaminated ground maintains a laminar flow. With this adjustment of the gas flow, the density of the contaminated ground must be taken into consideration. If the pressure is too high and a deterioration of the laminar gas flow and a whirl formation is caused, the important uniform action of the gas on the ground is disturbed. Moreover, for producing and maintaining a turbulent gas flow through the ground, a substantially higher energy consumption is needed with worsened cleaning action. In this situation the efficiency of the arrangement can be questionable.

The gas transporting device for producing the gas circulation flow can be arranged both in the shaft in the portion with the gas-impermeable shaft wall, or outside of the shaft. With the location outside of the shaft, the gas transporting device can be provided with a filtering device and connected with both gas-permeable regions of the shaft through concentrically extending tubes. The direction of the gas circulating flow produced by the gas transporting device can be reversed by simple switching of the gas transporting device.

The device for influencing the intensity of the gas flow in the shaft can be formed as a control or a regulating device which changes the output of the gas transporting device. In particular it can change the number of revolutions of the radial fan which is used as the gas transporting device. An automatic regulation, depending for example, on the flow intensity in the shaft or the pressure distribution in the shaft is also possible. The device can be formed however as a pure gas flow-breaking device. Such a breaking device need no adjustment and can be formed as an aperture. In many cases there is a uniform ground density, where the use of a non-adjustable gas flow resistance is recommended. Such a predetermined gas flow resistance is obtained in accordance with the present invention in that the gas passage resistance in the regions of the gas-permeable wall is fixed by a corresponding selection or design of this wall region.

The elements for changing the composition of the gas flow are not necessarily formed as conventional gas filters which remove gaseous impurities. Instead, these elements can be formed as or can additionally include devices for removing substances in the gas stream or withdrawing a partial gas stream, and chemically influencing the impurities in the ground.

In accordance with a preferable embodiment of the invention, the arrangement has a tubular insert which is exchangeably arranged in the shaft. The tubular insert has sieve walls surrounded by closed-wall tubular portions which are sealed by at least one outer sealing sleeve relative to a shaft wall. The gas transporting device is arranged in the closed-wall portions. The tubular insert can be provided with a liquid collecting bath at its lower end.

The gas-permeable sieve walls of the tubular insert can be advantageously formed as sieve fabric webs which are wound helically over supporting bars and rods provided for the tubular insert and having an axis-parallel orientation. The sieve fabric webs can be wound in one layer or several layers, abut bluntly against one another, or arranged with overlapping edges. The through flow resistance of these wall regions for the gas flow can be adjusted by the number of layers or the thickness of the overlapping regions.

The parts of the arrangements can be produced in a price-favorable manner. The whole arrangement requires very little space, since additional air-post flow shafts are dispensed with. The arrangement can be used also in inhabited areas where a continuous gas-tight covering of the ground regions to be purified can be insured. The process which is performed with the inventive arrangement and is characterized by the laminar gas flow can be performed with gas transporting devices having a low energy consumption. Therefore long term ground treatment can be obtained with the arrangement in an economical manner. This is true even when additional heating devices for increasing the efficiency of the gas, and also elements for changing the composition of the gas flow or influencing the pressure difference in the shaft are utilized. When a tubular insert is used, it can be removed in regular time intervals for cleaning or exchanging or reactivating of the utilized elements for influencing the composition of the gas flow.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figures 1, 2:
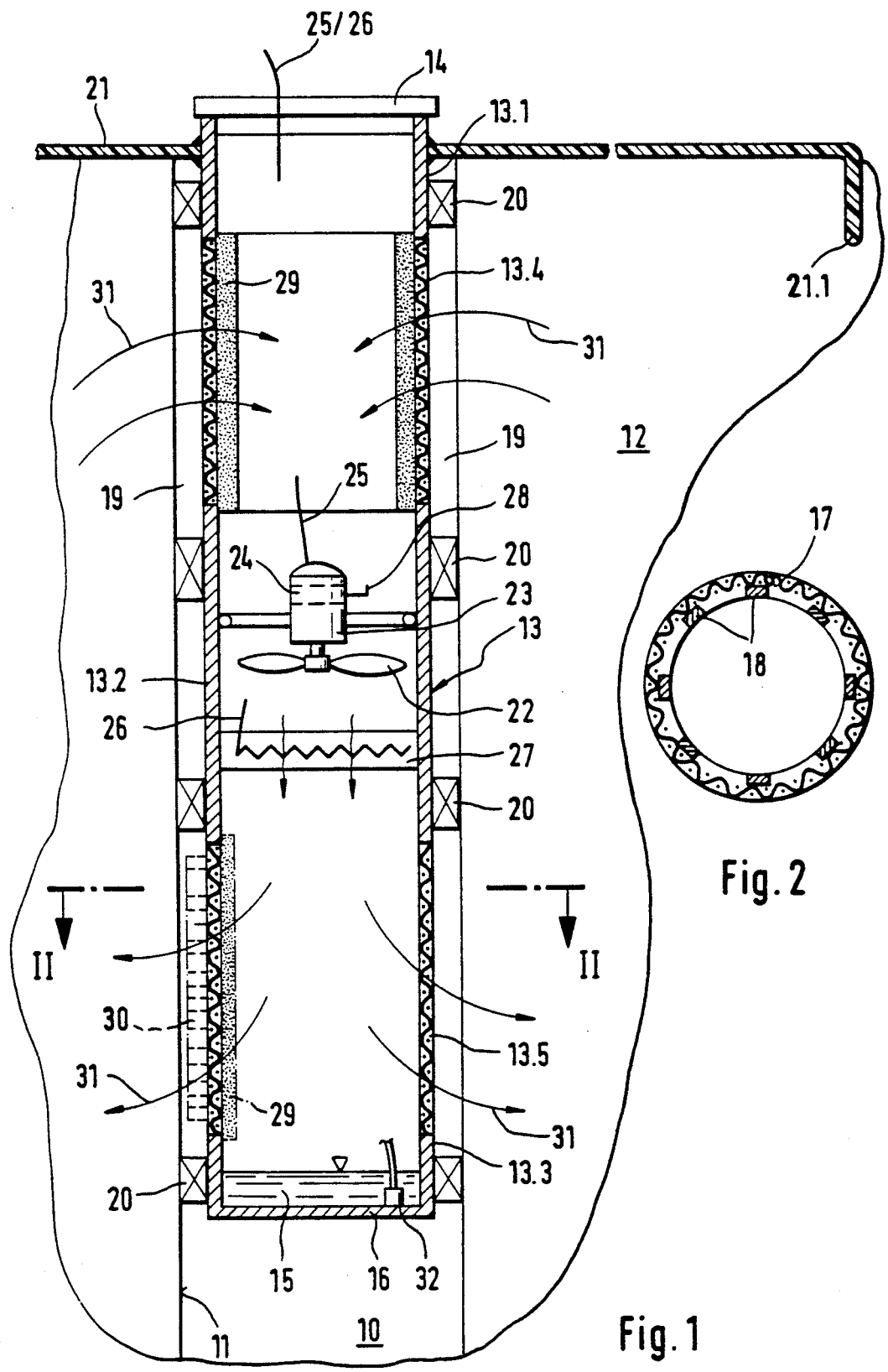
FIG. 1 is a view showing a central longitudinal section of an arrangement for treating gases from contaminated ground, in accordance with a first embodiment of the invention.
FIG. 2 is a view showing a section of the inventive arrangement in a gas-permeable wall region, taken along the line II—II in FIG. 1.

FIG. 1 shows a shaft opening 10 with a shaft wall 11, which is provided in a contaminated, ground water-free ground region 12. A tubular insert 13 is exchangeably arranged in the shaft. It is subdivided into several tubular portions over its length.

An end portion 13.1 with a gas-impermeable tubular wall is provided at the upper end which is closeable by a cover 14 in a gas-tight manner. A gas-impermeable tubular wall further has a central tubular portion 13.2 and an inner end portion 13.3. The end portion 13.3 together with an end wall 16 form a liquid collecting bath 15. A first or upper tubular portion 13.4 with a gas-permeable sieve wall is provided between the upper end portion 13.1 and the central tubular portion 13.2. A tubular portion 13.5 provided with a gas-permeable sieve wall is further located between a central tubular portion 13.2 and a lower end portion 13.3 of the tubular insert 13.

The sieve walls of the tubular portions 13.4 and 13.5 can be formed as shown in FIG. 2 of webs of woven sieve cloth 17. As shown in FIG. 2 it is wound on a supporting web 18 which is axis-parallel with the tubular insert and forms a connection between closed-wall tubular portions 13.1–13.3 The woven sieve fabric webs 17 can be wound in a multi-layer fashion or can overlap opposite sides with their edge regions as not shown in the drawings. From FIG. 1 it can be seen that an intermediate space between the tubular insert 13 and the shaft wall 11 in the region of the closed-wall tubular portions 13.1–13.3 is reached and interrupted by ring-shaped sealing sleeves 20. The sealing sleeves 20 can be formed as such sleeves which, after mounting the tubular inserts in the shaft opening 10, are inflatable.

The region of the ground 12 to be cleaned is covered around the shaft opening 10 with a gas-tight foil 21. The foil 21 is tightly connected with the upper end portion 13.1 of the tubular insert 13. The outer edge 21.1 of the foil 21 is tightly embedded in the ground region 12.

A radial fan 22 together with an electrical drive motor 23 and a control device 24 which controls a rotary speed of the motor are arranged in the interior of the central closed-wall tubular portion 13.2. These elements form a gas transporting device. Its electrical cable 25 together with a further cable 26 for an electrical heating device which can be arranged in the tubular portion 13.2 extends outwardly through the cover 14 of the tubular insert in a gas-tight manner. The control device 24 is provided in the shown embodiment with a flow sensor 28. The radial fan 22 produces in the tubular insert 13 a gas flow which is directed from above downwardly.

The sieve wall of the upper gas-permeable tubular portion 13.4 is provided in its inner side with a gas filtering jacket 29. Such an inner gas filtering jacket can also be arranged in the lower gas-permeable tubular portion 13.5, as identified with a dashed-dot line. An outer coating on the sieve wall in this region is also identified with a dashed-dot line. The outer coating is a gas-permeable coating 30. It contains materials cooperating with the discharged gas stream and providing a chemical action on the impurities contained in the ground region. The laminar gas circulating flow produced by the radial fan 23 flowing from the shaft opening 10 into the ground region 12 and back is identified with the arrow 31. Therefore, seeping water deposited in the tubular insert 13 can be aspirated from the liquid collecting bath 15 by means of an immersion pump 32.

Figure 3:
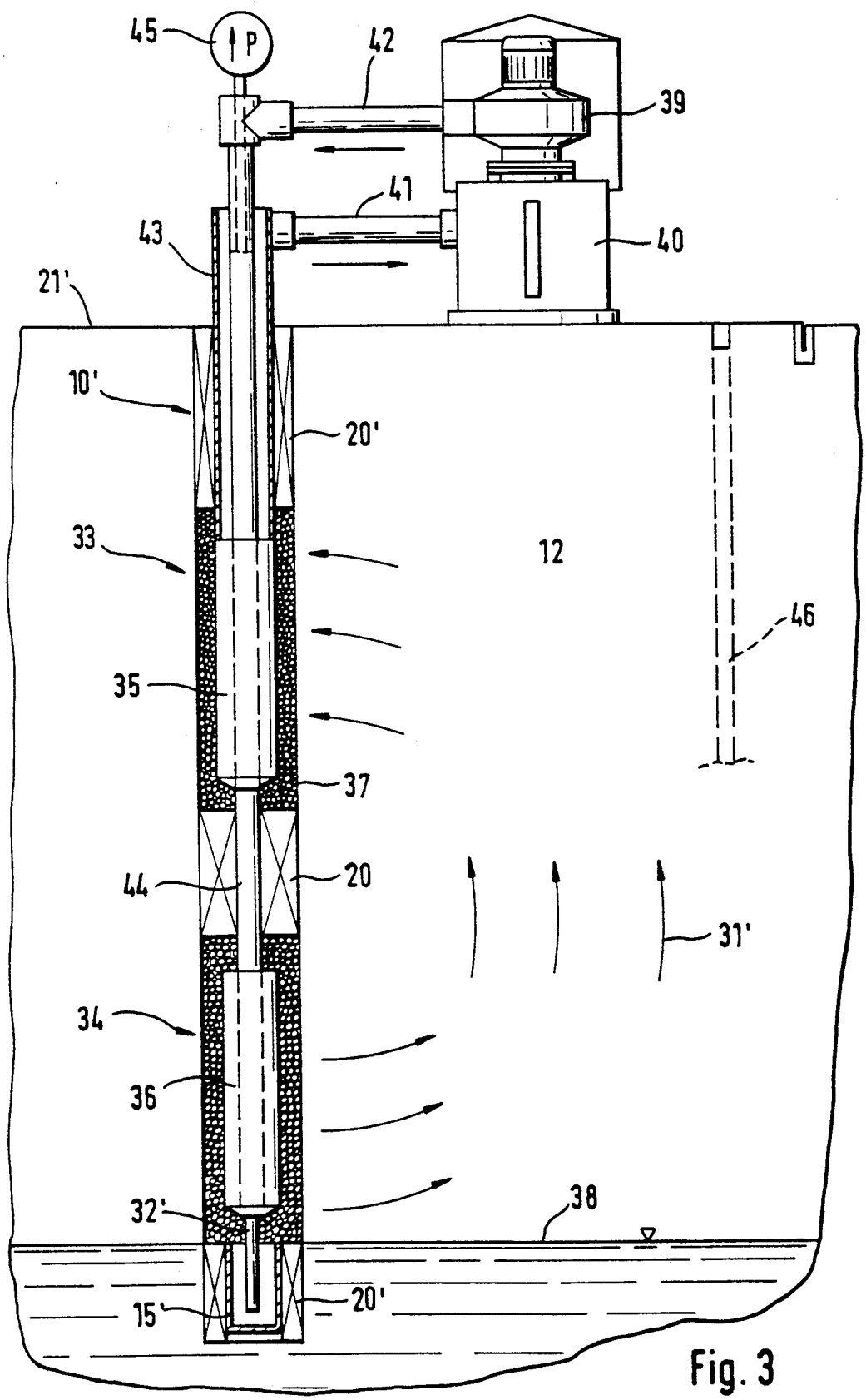
FIG. 3 is a view showing a central longitudinal section of the arrangement in accordance with a second embodiment of the present invention.

FIG. 3 shows a second embodiment of the inventive arrangement.

Two separate shaft regions 33 and 34 are formed by sealing sleeves 20' in a shaft wall 10' which is closed from above by a cover 21'. The shaft walls in the region 33 and 34 are gas-permeable. Double jacket filters 35 and 36 are arranged in the region 33 and 34 and surrounded by filter gravel 37. The lower end of the shaft 10' is closed with a cup insert 15' which serves as a liquid collecting container. The cup insert 15' is arranged under the ground water level 38.

For producing the gas circulating flow 31', a fan 39 is arranged above the ground surface and connected with a water separator 40. The fan 39 is connected by two connecting pipes 41 and 42 with pipes 43 and 44. The pipes 43 and 44 are arranged concentrically relative to the shaft. The outer pipe 43 extends to the filter 35 in the region 33 and ends at the upper end of the filter 35. The gas entering the gas permeable region flows through the filter 35 into the suction pipe 43. The gas is drawn into the pipe 43 by the suction effect of the pump or the fan 39. The inner pipe 44 extends to the lower gas-permeable shaft region 38 and serves for guiding the gas which exits in the ground region 12. The inner pipe 44 is connected with the pressure side of the fan 39 and leads the gas down into the filter 36, and then the gas flows through the region 34 back into the ground region 12. A water aspirating pipe 32' is arranged inside the inner pipe 44. It is connected with a pump 45 located outside of the shaft 10 and serves for aspirating of liquid from the top insert 15'. The inner pipe 32' is connected with the suction side of the separate pump 45 and transports the liquid out of the cup insert 15' for extracting the liquid and avoiding that the region 34 will be filled with the ground water. An opening 46 is made in a spaced relationship from the shaft for pressure equalization in the ground region 12.

In this embodiment also the speed of the gas flow 31' can be influenced by a corresponding filling of the double jacket filter 35, 36. Moreover, further devices can be provided on the ground surface, such as coal filter or a switching device for reversing the direction of the gas circulating flow. The gas is pumped in the upper shaft region 33 and aspirated from the lower region 34. In operation the fan 39 provides a gas circulation through the ground region as shown with the arrow 31'. Volatile impurities are gathered in the ground regions by the gas stream and caught in the filters 35, 36 (a part also in the region 33 and 34). The sealing 20' avoids a short circuit within the shaft 20.

It will be understood that each of the elements described above, or two or more together, may also find a useful application in other types of constructions differing from the types described above.

While the invention has been illustrated and described as embodied in an arrangement for treating gas from contaminated ground regions, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An arrangement for treating a contaminated ground-water free ground region in situ, comprising a shaft wall which is at least partially gas-permeable and forms a shaft in a gas-tightly closed region, said shaft wall having a gas-impermeable shaft portion spaced from a shaft opening and two gas-permeable wall portions which surround said gas-impermeable wall portion; gas transporting means for producing a gas circulating flow in the shaft and in the ground region; at least one device located in the shaft and influencing the intensity of the gas flow in the shaft in dependent on the density of the ground region for producing and maintaining a gas circulation with a laminar gas flow in the ground region; and at least one element provided in the region of said gas-permeable wall and operative for changing a composition of the gas flow.

2. An arrangement as defined in claim 1, wherein said gas transporting means is arranged in a shaft region which is provided with said gas-impermeable wall.

3. An arrangement as defined in claim 1, wherein said gas transporting means is located outside of the shaft and connected with a shaft region which has said gas-permeable wall.

4. An arrangement as defined in claim 3, wherein said gas transporting means is provided with a filtering element.

5. An arrangement as defined in claim 1; and further comprising means for reversing the gas circulating flow produced by said gas transporting means.

6. An arrangement as defined in claim 1, wherein said device for influencing the intensity of the gas flow in the shaft includes a device for controlling an output of said gas transporting means.

7. An arrangement as defined in claim 1, wherein said device for influencing the intensity of the gas flow in the shaft includes at least one adjustable gas flow braking device.

8. An arrangement as defined in claim 1, wherein said gas transporting means includes an axial fan.

9. An arrangement as defined in claim 1, wherein said element for changing the composition of the gas flow includes a gas filter for adsorbing gas parts contained in the gas flow.

10. An arrangement as defined in claim 9, wherein said gas filter includes a cover which covers said gas-impermeable wall portion of the shaft.

11. An arrangement as defined in claim 1, wherein said element for changing the composition of the gas flow includes a device for removing substances in the gas flow.

12. An arrangement as defined in claim 11, wherein said device includes a cover which covers said gas-permeable wall portion of the shaft.

13. An arrangement as defined in claim 1, wherein said element for changing the composition of the gas flow includes a device for withdrawing a partial gas stream.

14. An arrangement as defined in claim 13, wherein said device includes a cover which covers said gas-permeable wall portion of the shaft.

15. An arrangement as defined in claim 1; and further comprising a tubular insert which is exchangeably arranged in the shaft and forms said wall, said tubular insert having a closed-wall tubular portion which forms said gas-impermeable wall portion and two sieve walls which forms said gas-permeable wall portions.

16. An arrangement as defined in claim 15, wherein said gas transporting means is located in said closed-walled tubular portion.

17. An arrangement as defined in claim 15; and further comprising at least one outer sealing sleeve arranged to seal said closed-wall tubular portion against a wall of the shaft.

18. An arrangement as defined in claim 15, wherein said tubular insert has upper and lower ends; and further comprising means for sealing said upper and lower ends of said tubular insert relative to a shaft wall.

19. An arrangement as defined in claim 15, wherein said tubular insert has a lower end; and further comprising a liquid collecting bath located at said lower end of said tubular insert.

20. An arrangement as defined in claim 15; and further comprising at least one heating device arranged in said closed-wall tubular portion of said tubular insert.

21. An arrangement as defined in claim 15, wherein said gas-permeable sieve walls of said tubular insert are composed of a sieve fabric web which is helically wound.

22. An arrangement as defined in claim 21, wherein said sieve fabric web is wound in one layer with overlapping edges.

23. An arrangement as defined in claim 21, wherein said sieve fabric web is wound over a supporting member for said tubular insert which is axis-parallel to said tubular insert.

24. An arrangement for treating a gas from a contaminated ground region in situ, comprising a shaft wall which is at least partially gas-permeable and forms a shaft in a gas-tightly closed region, said shaft wall having a gas-impermeable shaft portion spaced from a shaft opening and two gas-permeable wall portions which surround said gas-permeable wall portion; gas transporting means for producing a gas circulating flow in the shaft and in the ground region; at least one device for influencing the intensity of the gas flow in the shaft in dependent on the density of the ground region for producing and maintaining a laminar gas flow in the ground region, said gas transporting means being located outside of the shaft and connected with a shaft region which has said gas-permeable wall; at least one element provided in the region of said gas-permeable wall and operative for changing a composition of the gas flow; and concentrically arranged pipes which connect said gas transporting means with said shaft region having said gas-permeable portion.

* * * * *